May 7, 1935.  J. C. PITMAN  2,000,609

FRYING KETTLE

Filed Aug. 6, 1927

Inventor
John C. Pitman
by Franklin F. Phillips, Jr.
his Attorney.

Patented May 7, 1935

2,000,609

UNITED STATES PATENT OFFICE 2,000,609

FRYING KETTLE

John C. Pitman, Saugus, Mass.

Application August 6, 1927, Serial No. 211,037

2 Claims. (Cl. 53—7)

My invention relates to kettles for frying with hot fat wherein the articles of food to be fried are commonly placed in a perforated basket which is partially immersed in the hot fat. When this method of frying is employed, the article to be fried, such as fish, clams, etc., is commonly first covered with cracker crumbs, corn meal or batter, and in the process of frying particles of such matter commonly become detached from the article of food which is being fried, and, unless some provision is made to prevent it, this debris from the frying articles of food will drop to the heated surface of the bottom of the kettle and, by contact with the heated surface of the interior of the base of the kettle, they will become burned, and consequently impregnate the fat with the products of their combustion, and will also otherwise undesirably flavor the fat so as to render it shortly unfit for further use in cooking. Various means of segregating this undesirable debris within the fat and protecting it from burning have been employed and it has been the special object of my invention to provide a simple, cheap, and effective means of segregating debris within the fat and preventing it from burning. It has been the further object of my invention to provide means for preventing the hot fat within the kettle from smoking so as to cause disagreeable smoke and vapors incidental to the use of this general type of apparatus.

Figure 1:
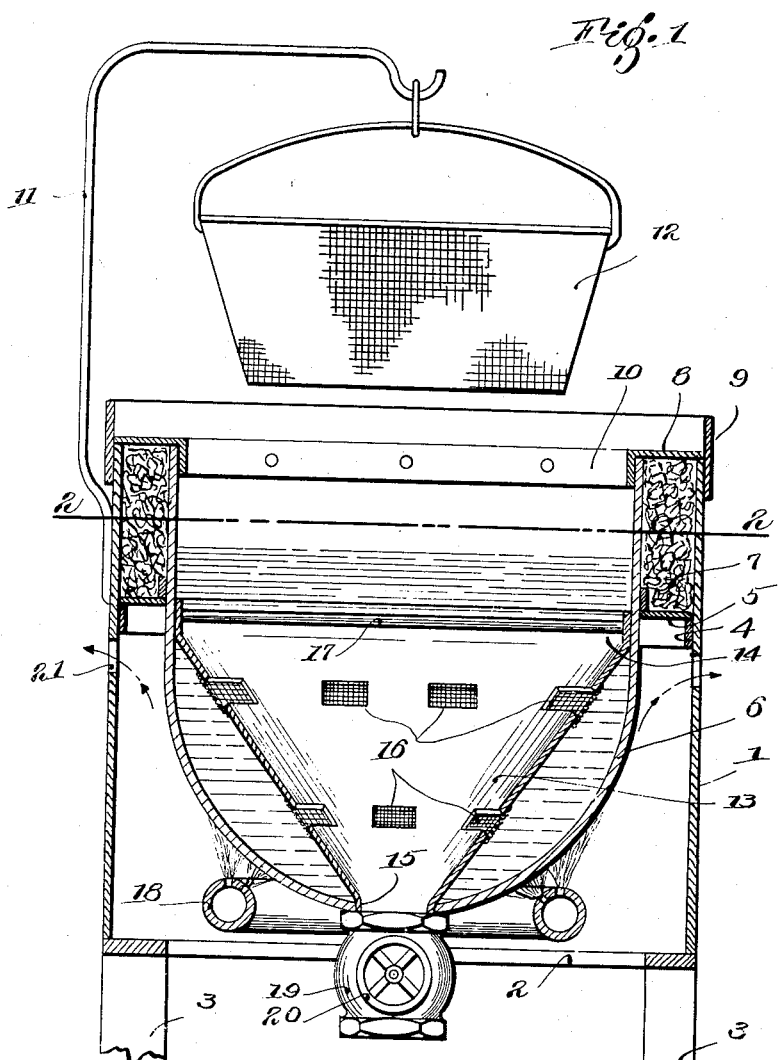

My invention may be best understood by reference to the accompanying drawing, in which Fig. 1 shows a side view of my device with the kettle and adjacent parts in vertical cross-section.

Figure 2:
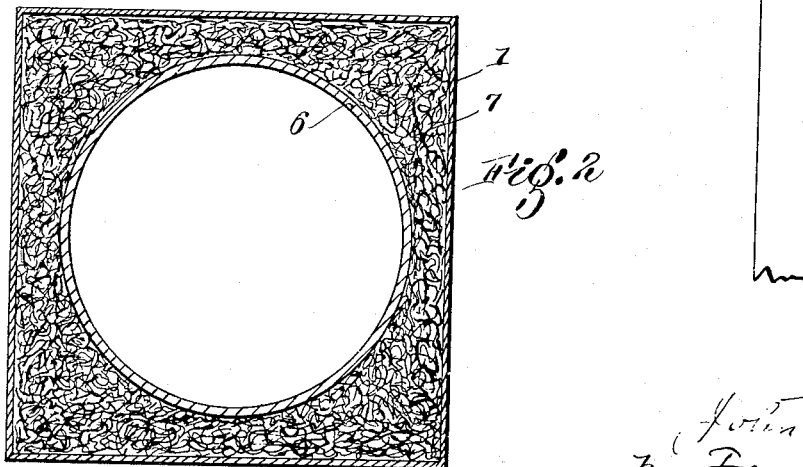

Fig. 2 is a section on line 2—2 of Fig. 1.

Referring now more specifically to the drawing, 1 is a square box-like frame having an open base 2 and supported by legs 3 at each corner thereof. Within the frame 1 there is secured a square metallic frame 4 which forms a support for the outer extremity of a flange 5 attached to the exterior of the kettle 6.

The top of the frame 1 is open so as to permit the space between the kettle 6 and the frame 1 to be packed with asbestos cement 7 or some other suitable non-heat-conducting material in the space which lies above the flange 5, after which the space so packed may be enclosed by a cap-plate 8 provided with a flange 9 which partly embraces the top of frame 1 and also provided with a dependent flange 10 which may be secured to the interior of the rim of the kettle 6.

Upon a bracket 11 attached to the side of the frame 1 is suspended the frying basket 12.

Within the kettle 6 there is removably mounted a funnel shaped member 13 which at its top has a vertical rim 14 which fits closely against the adjacent side of the kettle with free sliding fit, at a point substantially below the surface level of the cooking liquid. The neck 15 of the funnel shaped member 13 fits closely within a hole in the central part of the base of the kettle 6. Suitable holes 16, preferably covered by fine wire mesh, permit the circulation of hot fat within the interior of the kettle, allowing it to enter the space between the sides of the kettle 6 and the funnel shaped member 13 and flow inwardly therefrom. These holes 16 are preferably arranged and located as shown in Fig. 1 of the drawing. A cross bar 17 attached at either end to the opposite sides of the funnel shaped member 13 serves as a convenient aid in withdrawing the funnel shaped member 13 for the purpose of cleaning.

A ring-shaped gas burner 18 serves to apply heat to the bottom of the kettle 6 at points fairly remote from the neck of the funnel shaped member 13, and a draw-off valve 19 provided with a suitable handle 20 is located in the central part of the base of the kettle 6 below the opening in the base of the kettle in which is inserted the neck 15 of the funnel shaped member 13.

From the foregoing description it will be apparent that debris from articles being fried in the frying basket 12, when that basket is immersed in the hot fat, will fall on the converging sides of the funnel shaped member 13 and accumulate in the lower portion thereof adjacent the neck 15 and below the lower row of holes 16 at a point remote from the intense heat applied to the base of the kettle and hence will not be subject to rapid burning so as to spoil the fat within the kettle. Moreover, the circulation of fat within the kettle is such that there is an in-flow from the confined space between the sides of the kettle and the funnel shaped member, which in-flow passes through the upper row of holes 16, this in-flow being compensated by an out-flow of cooler fat through the lower row of holes 16, thus tending to subject the debris in the lower part of the funnel shaped member to the influence of the cooler part of the fat. The debris within the lower part of the funnel shaped member may be quickly and conveniently drawn off by opening valve 19 without the withdrawal of much of the useful fat within the kettle, and the contents of the kettle may thus be kept free from contamination by burned or overcooked particles of crumbs, meal, batter, or other debris.

In making provision within the kettle of means to shield the hot base and sides of the kettle from contact with the debris of cooking it is very important not to interfere with the rapid transfer of heat in the liquid cooking medium both by conductance and by convection. It is important that there be provision for a large volume of the cooking liquid in the base of the kettle between the heated base and the shielding means so that this large volume of the liquid may receive the unimpeded transfer of heat, and it is also important that there be an effective provision for the circulation of the liquid cooking medium, such that currents of freshly heated liquid may rise and have access to the area where cooking is done within or above the shielding means, and, upon cooling, may again descend and escape from the shielding means to a place where heat may be restored in order that the cycle may be repeated.

My funnel shaped member 13 is particularly well adapted for this purpose as it provides space for a large volume of liquid on its outside between this shielding member and the heated lower part of the kettle, along the inner surface of which convection currents rise, and causes the crowding of these rising currents in the more confined space, between the side of the kettle and the upper part of the funnel shaped member, so as to force the flow inward to the cooking area of the kettle. As in this inward progress the currents are cooled nearer the central vertical axis of the device by contact with the cold food inserted for cooking they tend to descend near the central vertical axis and hence encounter more readily the more centrally located lower row of apertures near the neck of funnel. Hence the rising and descending currents are kept apart so that the flow is easy and continuous and not interrupted by baffling effects of current meeting current and thus the high temperature necessary to be maintained in the cooking area is kept fairly constant so that charges of cold food to be cooked may be successively inserted in rapid manner without waiting between charges for heat losses to be restored.

I have noted that the tendency of fat in such kettles to become overheated and to smoke, thus causing disagreeable fumes, arises out of a condition commonly existing adjacent the sides of the kettle near the top where the fat becomes highly heated in the presence of air adjacent the interior surface of the kettle near the top thereof. To keep this area cool and to prevent such disagreeable fumes, I have provided the packing of insulated matter 7. The heat arising from the burner 18 may pass out of suitable holes 21 located closely beneath the supporting frame 4. Thus the sides of the kettle adjacent the top are kept relatively cool so that the smoking of the fat is reduced to a harmless minimum.

Having thus fully described my invention, what I claim is,—

1. In a device of the character specified the combination of a kettle, means for applying heat to the bottom portion of said kettle and a funnel shaped member mounted within said kettle, the top rim of said funnel shaped member being arranged to contact loosely with the inside of the wall of the kettle, at a point substantially below the surface level of an operative charge of the cooking liquid, said funnel shaped member being provided with an upper row of holes in the upper portion thereof and with a lower row of holes in the lower restricted portion thereof.

2. In a device of the character specified the combination of a kettle having a base portion which is rounded in vertical cross-section, means for applying heat to the bottom portion of said kettle and a funnel shaped member removably mounted within said kettle, said funnel shaped member being provided with an upper row of holes in the upper portion thereof and with a lower row of holes in the lower restricted portion thereof.

JOHN C. PITMAN.